(Model.)

W. E. LAWRENCE.
CURRY COMB.

No. 250,549. Patented Dec. 6, 1881.

Attest:
Courtney A. Cooper
William Paxton

W. E. Lawrence,
By Chas. E. Foster,
Atty.

UNITED STATES PATENT OFFICE.

WILLIAM E. LAWRENCE, OF NEW YORK, N. Y.

CURRY-COMB.

SPECIFICATION forming part of Letters Patent No. 250,549, dated December 6, 1881.

Application filed August 30, 1881. (Model.)

*To all whom it may concern:*

Be it known that I, WILLIAM E. LAWRENCE, a citizen of the United States, and a resident of the city, county, and State of New York, have invented certain Improvements in Curry-Combs, of which the following is a specification.

My invention is an improvement in curry-combs whereby the handling of the comb is facilitated and the cost of manufacture reduced.

Figure 1:
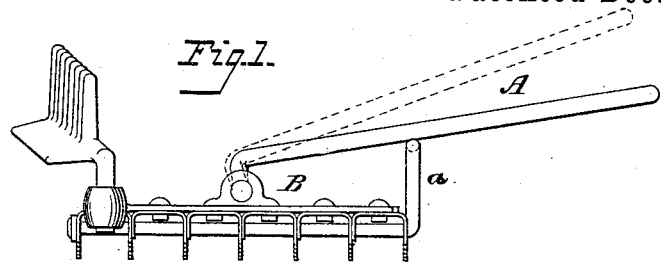
Figure 2:
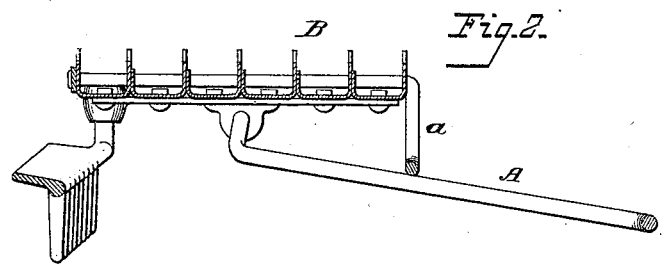
Figure 3:
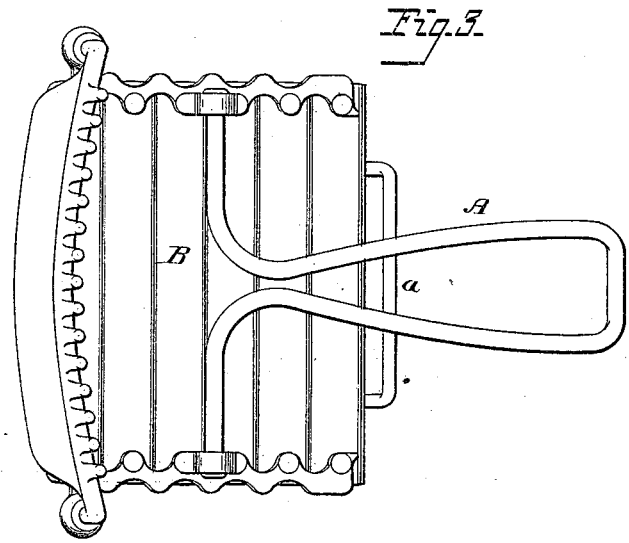
Figure 4:
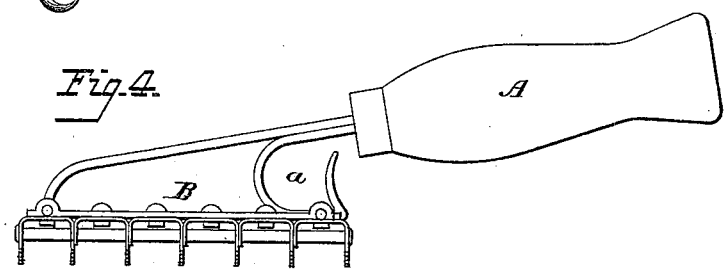

In the drawings, Figure 1 is a side elevation of a curry-comb, showing my improvement; Fig. 2, a side elevation, showing the same inverted; Fig. 3, a plan view; Fig. 4, a modification.

In curry-combs having side handles as well as back grasping devices it has been common to bend or extend the tang upward near one edge of the comb to afford a bearing for the thumb, as in the Letters Patent granted to me November 17, 1874. This necessitates a direct connection between the tang and handle at the rear edge of the comb, which is not always desirable, as it is often advisable to form a flexible connection between the handle A and the body of the comb B—as, for instance, in the Letters Patent granted to me August 23, 1881, or as in the Letters Patent granted to C. E. L. Holmes, November 23, 1875. For this reason I place a bearing-piece, $a$, upon the body of the comb at one edge, and having no connection with the handle. This may be in the form of a solid lip or projection, as in Fig. 4, but is preferably in the form of a loop, as shown in Figs. 1, 2, and 3.

By providing the comb with a loop bearing I not only secure a rest for the thumb, but also a means of preventing the comb-body, when fastened to the handle, from swinging when the brush is drawn across the same, as would otherwise result, the comb in such case being held in the left hand, in the position shown in Fig. 2, the end of the thumb entering the loop $a$.

To prevent the expense of forming the grasping attachment above the back in two parts, as well as prevent the loss resulting from the detaching of the ordinary wood handles, I form the side handle, A, in one piece with the connecting devices by bending a wire to the form shown in Figs. 1, 2, and 3, jointing the bent ends of the wires in the lugs $c\ c$, as shown.

I do not limit myself to any special form of handle in a comb-body, any of the usual constructions being available in connection with my improvements.

I claim—

1. A curry-comb provided with a grasping device over the back, a side handle extending from the same beyond the rear of the body, and a thumb-loop, $a$, attached to the body adjacent to one edge, below and independent of the said side handle, substantially as set forth.

2. The combination of the body, handle jointed to the body and extending over and beyond the rear of the same, and a looped rest below said handle and independent thereof, substantially as set forth.

In testimony whereof I have signed my name to this specification in the presence of two subscribing witnesses.

WILLIAM E. LAWRENCE.

Witnesses:
 SAMUEL KILPATRICK,
 J. W. HALLENBECK.